UNITED STATES PATENT OFFICE.

ARTHUR LEHMANN, OF BERLIN, GERMANY.

PROCESS OF PREPARING SECONDARY-BATTERY PLATES.

SPECIFICATION forming part of Letters Patent No. 684,831, dated October 22, 1901.

Application filed October 10, 1900. Serial No. 32,612. (No specimens.)

*To all whom it may concern:*

Be it known that I, ARTHUR LEHMANN, a citizen of Prussia, Germany, residing at Berlin, Germany, have invented a new and useful Process of Preparing Secondary-Battery Plates, of which the following is a full, clear, and exact specification.

This invention relates to a rapid formation process for preparing secondary batteries which makes it possible to shorten the time required for the production of the plates.

The lead electrodes coming from the founding-machine are made to show a chemically-pure metallic surface, for which purpose brushes or a jet of sand-blast are used. These plates are then conveyed into a bath containing a solution of an organic acid. The acid can be palmitic acid, stearic acid, oxalic acid, lactic acid, &c., or any one of the fatty acids. In this bath the electrodes are exposed to an electric current for a certain length of time. In this bath under the action of the electric current the plates are rendered more receptive and the surface is increased similar to ribbed plates. The reactions taking place are for the application of oxalic acid, ($C_2O_4H_2$.) The acid decomposes under the influence of the electric current, and $C_2O_4$ combines with Pb to $C_2O_4Pb$, (oxalate of lead.) When carbonate of sodium is added to the oxalic acid, there is formed first from $C_2O_4H_2$ and $Na_2CO_3$ $C_2O_4Na_2CO_2H_2O$. From the oxalate of sodium $C_2O_4Na_2$ there takes place another separation into $Na_2$ and $C_2O_4$, the latter combining with Pb.

It has been found that the lead electrodes are attacked more intensely in the bath containing an organic acid if the acid solution in the bath is neutralized or made alkaline by the addition of carbonate of sodium. After the current has been passed through the solution the alkaline solution becomes acid, and it is thought that the organic acid employed is more effective in the nascent state.

From the deep coloring of the positive plates can be judged whether the plates have been attacked sufficiently. In that case the plates are removed, washed in running water, and then hung up in a bath containing lye of caustic soda. After the plates have been exposed to the lye of caustic soda for a certain time they are again washed in running water and dried, so that nothing remains of the organic acid used to attack the plate and to make it a conductor. For the further formation of accumulators sulfuric acid can be used. In the sulfuric acid the plates are then exposed to the electric current for about fifty hours, and they can then be considered ready for use.

I claim—

The herein-described process of forming accumulator-plates consisting in subjecting the plates to the action of an electric current while in a bath containing a fatty acid, neutralizing said acid-bath to cause the organic acid to act in its nascent state, removing the plates from the bath and exposing them to lye of caustic soda, washing them, drying them, and exposing them to the action of sulfuric acid, substantially as described.

In witness whereof I have hereunto set my hand in presence of two witnesses.

ARTHUR LEHMANN.

Witnesses:
  HENRY HASPER,
  WOLDEMAR HAUPT.